OR DESIGN REGISTRATION
243
No Printed Specification Available
2 Sheets—Sheet 1.
O. NICHOLS.
Grist Mill.
No. 111.
A. I. Patented May 30, 1854.
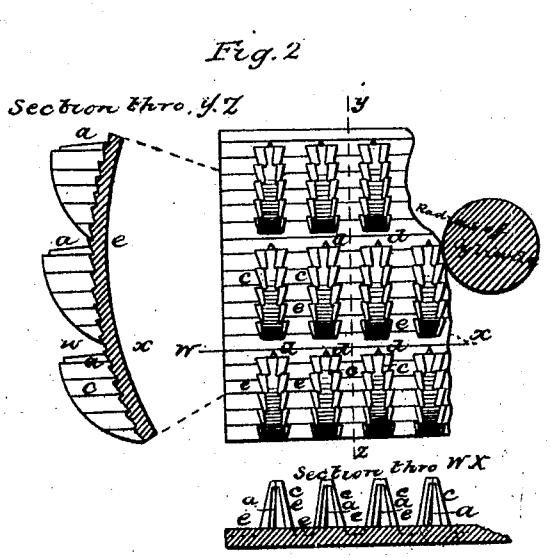
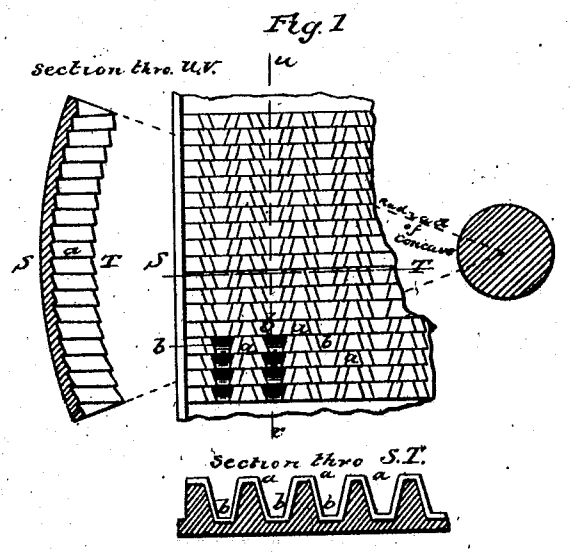
N. PETERS, Photo-Lithographer, Washington, D.C.

243
No Printed Specification Available
2 Sheets—Sheet 2.
O. NICHOLS.
Grist Mill.
~~No. 111.~~ A. I. Patented May 30, 1854.
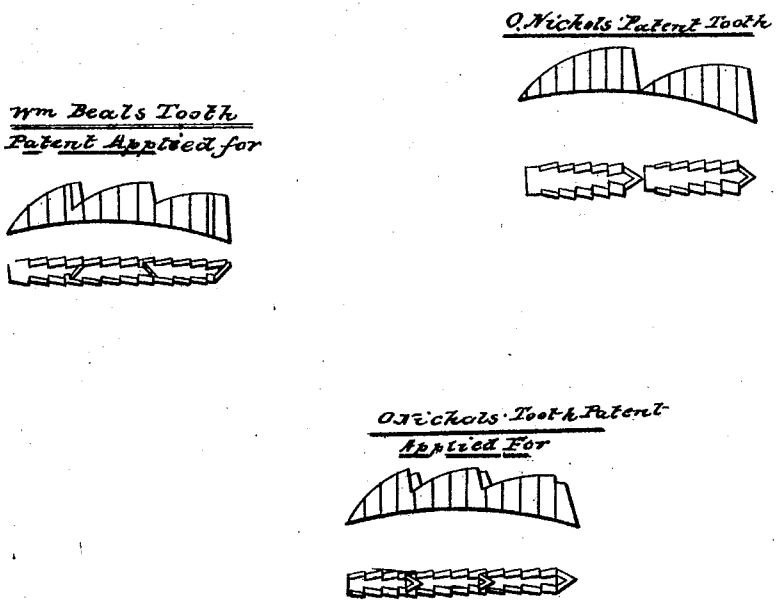
N. PETERS, Photo-Lithographer, Washington, D.C.